(12) United States Patent
Kim et al.

(10) Patent No.: US 11,897,903 B2
(45) Date of Patent: Feb. 13, 2024

(54) METAL ORGANIC FRAMEWORKS AND ENERGY STORAGE SYSTEM INCLUDING THIS

(71) Applicants: KOREA INSTITUTE OF ENERGY RESEARCH, Daejeon (KR); Center for Advanced Meta-Materials, Daejeon (KR)

(72) Inventors: Hyun Uk Kim, Daejeon (KR); Seong Ok Han, Daejeon (KR); Jung Joon Yoo, Daejeon (KR); Tae Woo Kim, Daejeon (KR); Se Gi Byun, Daejeon (KR); Hak Joo Lee, Daejeon (KR); Young Hoon Seong, Sejong-si (KR); Yogendra Kumar, Daejeon (KR)

(73) Assignees: KOREA INSTITUTE OF ENERGY RESEARCH, Daejeon (KR); CENTER FOR ADVANCED META-MATERIALS, Daejeon (KR)

( * ) Notice: Subject to any disclaimer, the term of this patent is extended or adjusted under 35 U.S.C. 154(b) by 0 days.

(21) Appl. No.: 17/979,259

(22) Filed: Nov. 2, 2022

(65) Prior Publication Data
US 2023/0303607 A1  Sep. 28, 2023

(30) Foreign Application Priority Data
Nov. 3, 2021 (KR) .......... 10-2021-0149377

(51) Int. Cl.
| | | |
|---|---|---|
| C07F 9/6553 | (2006.01) | |
| H01M 4/13 | (2010.01) | |
| C07F 15/04 | (2006.01) | |
| H01M 4/38 | (2006.01) | |
| H01M 4/60 | (2006.01) | |

(52) U.S. Cl.
CPC .......... *C07F 15/045* (2013.01); *H01M 4/13* (2013.01); *H01M 4/38* (2013.01); *H01M 4/60* (2013.01)

(58) Field of Classification Search
CPC .......... C07F 15/045; H01M 4/13; H01M 4/38; H01M 4/60
See application file for complete search history.

(56) References Cited

PUBLICATIONS

The Reactions of Thianthrene and Selenanthrene with AlCl3: Coordination Complexes, Radical Ions, and Investigations on the Unique Triple-Decker Molecule (Thianthrene)3 2+, Tjahjanto et al., Eur. J. Inorg. Chem. 2012, 3625-3635.*
An Electron-Deficient Triosmium Cluster Containing the Thianthrene Ligand: Synthesis, Structure and Reactivity of [Os3(CO)9(I3-g2-C12H7S2)(I-H)], Raha et al., J Clust Sci (2008) 19:47-62.*
Synthesis and ligand properties of thianthrenophane, Amthor et al., Org. Biomol. Chem., 2004, 2, 2897-2901.*
Suppression of Parasitic Chemistry in Li—O2 Batteries Incorporating Thianthrene-Based Proposed Redox Mediators, Arrechea et al., ACS Appl. Energy Mater. 2020, 3, 8812-8821.*
New Ruthenium Carbonyl Clusters Containing Unusual (μ5-Sulfido-,(μ4-Benzyne-, and Thianthrene-Derived Ligands: Insertion of Ruthenium into the Thianthrene Ring by C-S Activation, Hassan et al., Organometallics 2007, 26, 4627-4633.*
Synthesis and structure of a novel bis ( la,-xl"-thianthrene )disilver (I) bis ( perchlorate ), Munakata et al., Inorganica Chimica Acta 271 ( 1998 ) 145-15U.*
Guest-dependent single-ion magnet behaviour in a cobalt(II) metal-organic framework, Vallejo et al., Chem. Sci., 2016, 7, 2286-2293.*

* cited by examiner

*Primary Examiner* — Haidung D Nguyen
(74) *Attorney, Agent, or Firm* — Birch, Stewart, Kolasch & Birch, LLP

(57) ABSTRACT

The present invention relates to a metal-organic framework and an energy storage system having the same, and more specifically, to an energy storage system that is capable of providing excellent electrical conductivity and electrochemical capacity properties, especially excellent electrochemical performance at low temperatures, by means of a novel one-dimensional metal-organic framework having thianthrene-based organic ligands.

20 Claims, 16 Drawing Sheets

Fig. 14A
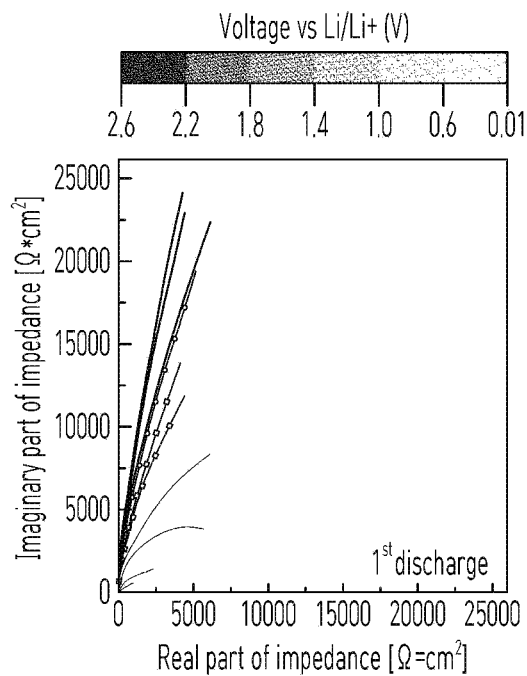
Fig. 14B
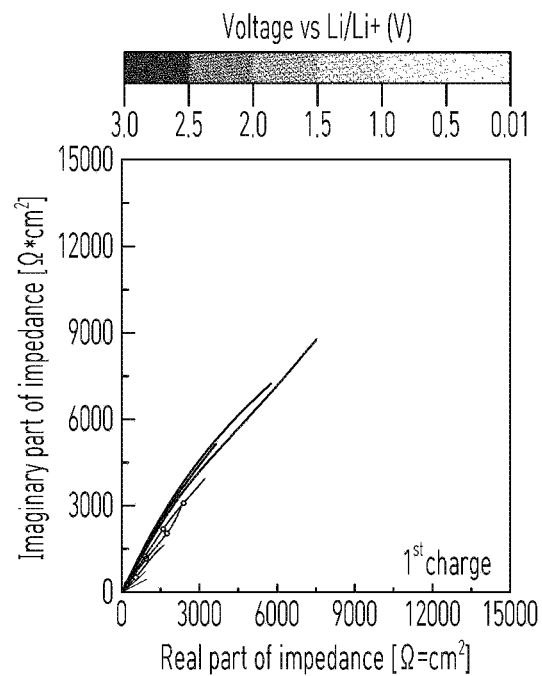
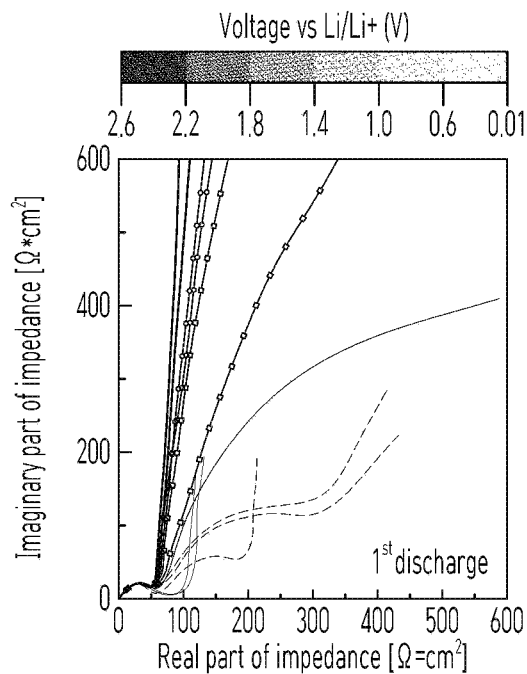
Fig. 14C
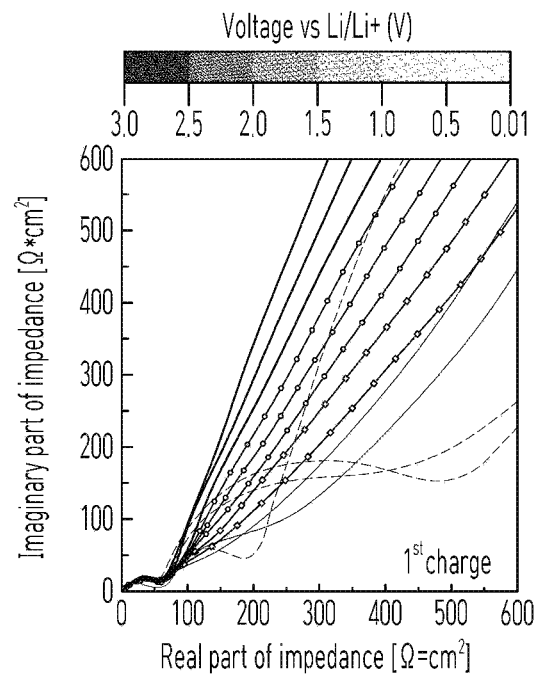
Fig. 14D

[Fig. 15]
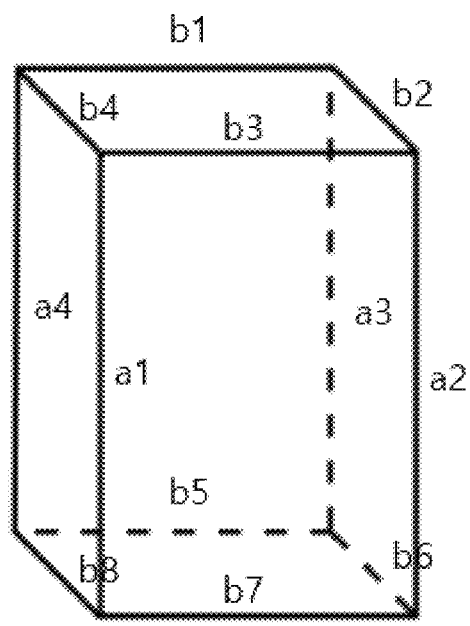

METAL ORGANIC FRAMEWORKS AND ENERGY STORAGE SYSTEM INCLUDING THIS

BACKGROUND OF THE INVENTION

Cross Reference to Related Application of the Invention

The present application claims the benefit of Korean Patent Application No. 10-2021-0149377 filed in the Korean Intellectual Property Office on Nov. 3, 2021, the entire contents of which are incorporated herein by reference.

FIELD OF THE INVENTION

The present invention relates to a metal-organic framework and an energy storage system having the same, and more specifically, to an energy storage system that is capable of providing excellent electrical conductivity and electrochemical capacity properties by means of a novel one-dimensional metal-organic framework having thianthrene-based organic ligands.

BACKGROUND OF THE RELATED ART

A lithium-ion battery (LIB) has high energy density and good cycle stability so that it is a predominant battery type in a secondary battery market. However, the LIB has slow electron transfer and ion diffusion so that it has some disadvantages of a low capacity and a slow charging behavior. If a metal oxide-based electrode material is used as an anode active material, the capacity and charging speed of the LIB may be improved. However, the charging and discharging step, high cost, and non-environmental characteristics of the metal oxide-based electrode material may cause difficulties in real application to the LIB. A lot of interest has been shown to an organic conductive electrode material with low toxicity and price and high efficiency. However, high solubility of organic molecules may cause fast capacity reduction as cycling is developed.

Therefore, there is a definite need to develop a new electrode material capable of solving the above-mentioned problems.

SUMMARY OF THE INVENTION

Accordingly, the present invention has been made in view of the above-mentioned problems occurring in the related art, and it is an object of the present invention to provide a metal-organic framework and an energy storage system having the same that are capable of providing excellent electrical conductivity and electrochemical capacity properties, especially excellent electrochemical performance at low temperatures.

To accomplish the above-mentioned objects, according to one aspect of the present invention, a metal-organic framework may include the coordination bond between metals and organic ligands, the organic ligands having one or more species selected from the group consisting of a first expression, a second expression, and a third expression as will be suggested below:

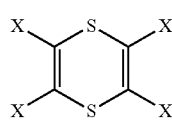

[First expression]

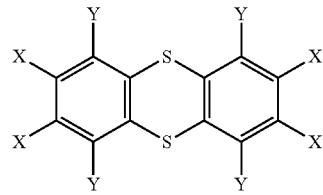

[Second expression]

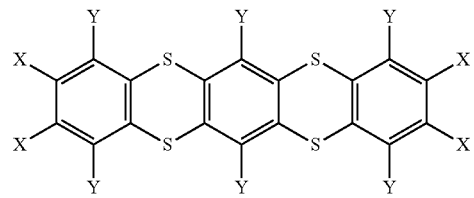

[Third expression]

(wherein in the first expression, the second expression, or the third expression, X is selected independently from the group consisting of OH, $NH_2$, SH, SeH, and COOH, and Y is selected independently from the group consisting of H, CN, F, Br, OH, and $OCH_3$).

The metals may be one or more kinds of metal elements or ions selected from the group consisting of Ni, Sc, Ti, V, Cr, Mn, Fe, Co, Cu, Zn, Y, Zr, Nb, Mo, Tc, Ru, Rh, Pd, Cd, La, W, Os, Ir, Pt, Au, Hg, Sm, Eu, Gd, Tb, Dy, Ho, Al, Ga, In, Ge, Sn, Pb, Li, Na, K, Rb, Cs, Mg, Ca, Sr, and Ba.

The metal-organic framework according to the present invention may have a length in the range of 50 nm to 300 μm and a width in the range of 10 nm to 200 μm.

The metal-organic framework according to the present invention may have a bar-like crystal shape.

To accomplish the above-mentioned objects, according to another aspect of the present invention, an energy storage system may include a slurry layer containing an electrode active material, the electrode active material having the metal-organic framework according to the present invention.

The slurry layer may further include a conductive additive.

According to the present invention, desirably, 10 to 200 parts by weight of the conductive additive may be present with respect to 100 parts by weight of the metal-organic framework.

The energy storage system according to the present invention may increase a specific capacity as the cycle number increases.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 14A to 14D are graphs showing estimation results of staircase potential electrochemical impedance spectroscopy for the coin cell according to the second embodiment of the present invention;

FIG. 15 is an exemplary view showing the crystal shape of the 1D MOF according to the first embodiment of the present invention; and FIGS. 16A to 16D are graphs showing low temperature electrochemical performance of the coin cell according to the second embodiment of the present invention, wherein FIG. 16A shows initial CV curves obtained at a scan rate of 0.1 mV s−1, FIG. 16B shows discharge capacities of the 1D MOF at 236.19 mAhg−1 (0.2 C), FIG. 16C shows a fifth constant current discharge-charge curve of ID MOF electrode, and FIG. 16D shows specific capacity and Coulombic efficiency of the 1D MOF after 50 cycles on 0.2 C.

DETAILED DESCRIPTION OF THE PREFERRED EMBODIMENTS

Figure 1:
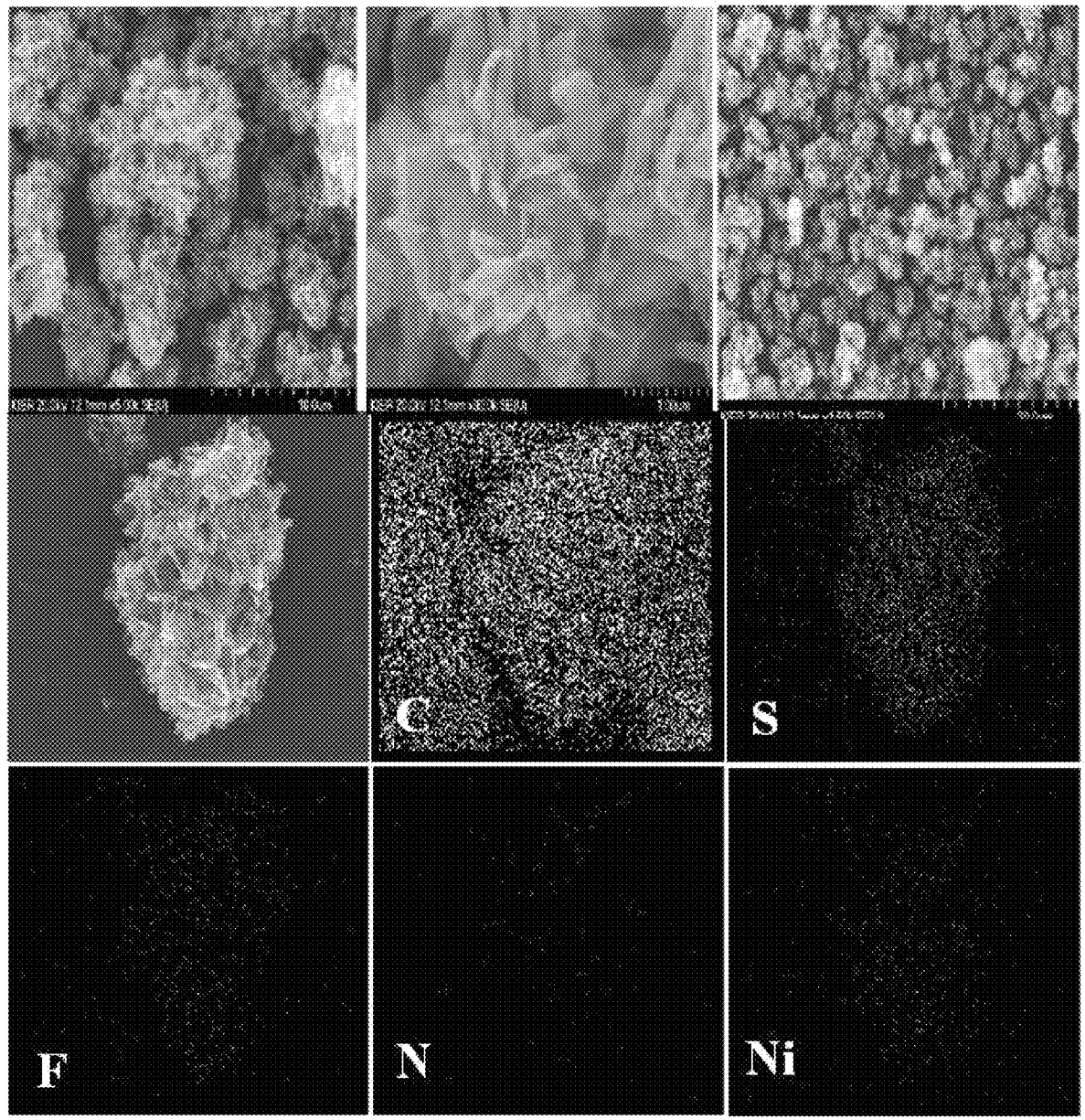
FIG. 1 shows SEM and SEM-EDS images of 1D MOF according to a first embodiment of the present invention.

In the specification, properties as will be mentioned later, which are influenced by measurement temperature and/or measurement pressure, are the results measured at a room temperature and/or atmospheric pressure unless otherwise defined.

The term, the room temperature is a normal temperature not heated or cold, for example, a temperature in the range of 10 to 30° C., particularly a temperature of about 23 or 25° C. In the specification, further, a unit of a temperature is ° C. unless otherwise defined.

The term the atmospheric pressure is a natural pressure having any addition or reduction in pressure and generally means about 1 atmosphere.

In the specification, in the case of the properties influenced by measurement humidity, they are measured in natural humidity that is not specially adjusted at the room temperature and/or the atmospheric pressure.

According to one aspect of the present invention, a metal-organic framework (MOF) is provided. In the specification, the term, a metal-organic framework is a crystalline nanoporous solid formed by the coordination bond between metals (ions and/or clusters) and organic ligands to form a three-dimensional structure. The metal-organic framework is made of various materials according to their use and purpose. The present invention relates to the metal-organic framework that is capable of providing excellent electrical conductivity and/or electrochemical capacity properties.

According to the present invention, the metal-organic framework may include, for example, the coordination bond between metals and organic ligands. The metal-organic framework of the present invention appropriately bonds the metals to the organic ligands having special structures as follows, thereby achieving excellent electrical conductivity and/or high electrochemical capacity according to their special mechanism.

The organic ligands have one or more species selected from the group consisting of a first expression, a second expression, and a third expression as will be suggested below.

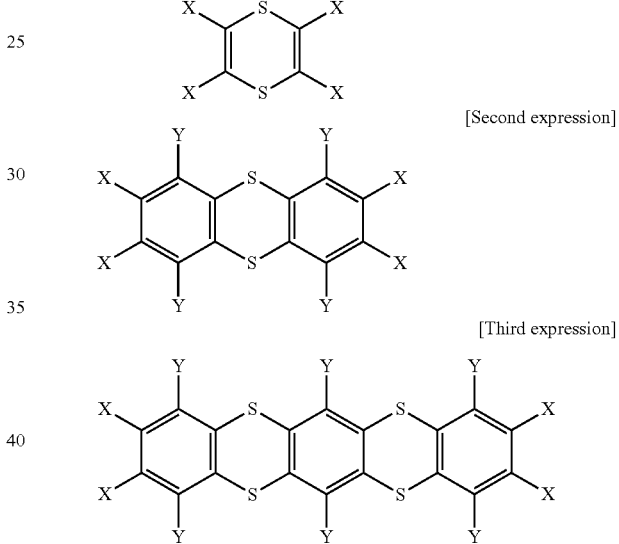

[First expression]

[Second expression]

[Third expression]

In the first expression, the second expression, or the third expression, X is selected independently from the group consisting of OH, $NH_2$, SH, SeH, and COOH, and Y is selected independently from the group consisting of H, CN, F, Br, OH, and $OCH_3$.

In the first expression, the second expression, or the third expression, the X is the same as or different from each other. The X is desirably $NH_2$ so that it is bonded to metals as will be discussed later to provide the properties of excellent electrical conductivity and/or high electrochemical capacity.

In the first expression, the second expression, or the third expression, the Y is the same as or different from each other. The Y is desirably H, CN, F, Br, OH, and $OCH_3$, more desirably, H and F so that it has affinity with $Li^+$.

The metal-organic framework of the present invention bonds the above-mentioned organic ligands to the metals as will be discussed later to achieve desired effectiveness.

The metals are one or more kinds of metal elements or ions selected from the group consisting of Ni, Sc, Ti, V, Cr, Mn, Fe, Co, Cu, Zn, Y, Zr, Nb, Mo, Tc, Ru, Rh, Pd, Cd, La, W, Os, Ir, Pt, Au, Hg, Sm, Eu, Gd, Tb, Dy, Ho, Al, Ga, In, Ge, Sn, Pb, Li, Na, K, Rb, Cs, Mg, Ca, Sr, and Ba.

The metals may be desirably Ni, Cu, Mn, Co, Ti, and/or V from the view of reversible oxidation/reduction, more desirably metal elements or ions of Ni from the view of planar bonding to the organic ligands.

According to the metal-organic framework of the present invention, the metals may be oxidized or reduced by means of the interaction between the metals and the organic ligands, and accordingly, the capability of the metals for receiving electrons can be improved. The metal-organic framework of the present invention has the above-mentioned special structure (for example, existence of —S—) and the properties of the special structure, thereby providing excellent electrical conductivity and high electrochemical capacity, especially excellent electrochemical performance at low temperatures.

The metal-organic framework according to the present invention has the properties as will be discussed later, thereby more effectively achieving the objects of the present invention.

The metal-organic framework of the present invention may have a length, for example, in the range of 50 nm to 300 µm. The length of the metal-organic framework may be measured according to estimation examples as will be discussed later. The metal-organic framework of the present invention may have a length of 60 nm or more, 70 nm or more, 80 nm or more, 90 nm or more, 100 nm or more, 110 nm or more, 120 nm or more, 130 nm or more, 140 nm or more, 150 nm or more, 160 nm or more, 170 nm or more, 180 nm or more, 190 nm or more, or 200 nm or more, and otherwise, it may have a length of 250 µm or less, 200 µm or less, 150 µm or less, 100 µm or less, 50 µm or less, 40 µm or less, 30 µm or less, 20 µm or less, 10 µm or less, 5 µm or less, 1 µm or less, 900 nm or less, 800 nm or less, 700 nm or less, 600 nm or less, or 500 nm or less.

The metal-organic framework of the present invention may have a width, for example, in the range of 10 nm to 200 µm. The width of the metal-organic framework may be measured according to the estimation examples as will be discussed later. The metal-organic framework of the present invention may have a width of 11 nm or more, 12 nm or more, 13 nm or more, 14 nm or more, 15 nm or more, 16 nm or more, 17 nm or more, 18 nm or more, 19 nm or more, or 20 nm or more, and otherwise, it may have a width of 150 µm or less, 100 µm or less, 50 µm or less, 40 µm or less, 30 µm or less, 20 µm or less, 10 µm or less, 1 µm or less, 900 nm or less, 800 nm or less, 700 nm or less, 600 nm or less, 500 nm or less, 400 nm or less, 300 nm or less, or 200 nm or less.

The metal-organic framework of the present invention may have, for example, a bar-like crystal shape. In the specification, according to an embodiment of the present invention, the length of the metal-organic framework may mean any one of lengths a1, a2, a3, and a4 in the bar-like crystal shape as shown in FIG. 15, and according to another embodiment of the present invention, the length of the metal-organic framework may mean any one of lengths b1, b2, b3, b4, b5, b6, b7, and b8 in the bar-like crystal shape as shown in FIG. 15. FIG. 15 shows an example of the metal-organic framework according to the present invention, and in this case, the metal-organic framework has the shape of a rectangular parallelepiped where a1 to a4 have the same value as one another and b1 to b8 have the same value as one another. However, the a1 to a5 may have the same value as or be different from one another, and the b1 to b8 may have the same value as or be different from one another. For example, the length of the metal-organic framework may be larger than the width thereof.

The metal-organic framework according to the present invention may have, for example, electrical conductivity of 1 to 1000 µS/m. The electrical conductivity may be a value measured at a room temperature. For another example, the metal-organic framework according to the present invention may have electrical conductivity of 2 µS/m or more, 3 µS/m or more, 4 µS/m or more, 5 µS/m or more, 6 µS/m or more, or 7 µS/m, and otherwise, it may have electrical conductivity of 800 µS/m or less, 500 µS/m or less, 200 µS/m or less, 100 µS/m or less, 50 µS/m or less, or 10 µS/m or less.

The metal-organic framework according to the present invention may have, for example, Brunauer, Emmett and Teller (BET) specific surface area of 1 to 1000 m$^2$/g. The BET specific surface area is determined on nitrogen (N2) adsorption isotherm at 77K. The metal-organic framework according to the present invention may have, for another example, BET specific surface area of 5 m$^2$/g or more, 10 m$^2$/g or more, 15 m$^2$/g or more, or 20 m$^2$/g or more, and otherwise, have BET specific surface area of 500 m$^2$/g or less, 100 m$^2$/g or less, or 50 m$^2$/g or less.

According to another aspect of the present invention, an energy storage system is provided.

The energy storage system of the present invention may have a slurry layer containing, for example, an electrode active material. The electrode active material may include, for example, the metal-organic framework. The description on the metal-organic framework is the same as above.

The energy storage system of the present invention may further have, for example, a conductive additive. The conductive additive may be graphite such as natural graphite, artificial graphite, and the like; a carbon-based material such as carbon black, acetylene black, ketjenblock, channel black, furnace black, lamp black, thermal black, carbon fibers, and the like; metal powder or metal fibers such as copper, nickel, aluminum, silver, and the like; conductive whiskey such as zinc oxide, potassium titanate, and the like; conductive metal oxide such as titanium oxide, and the like; or a conductive polymer such as polyphenylene derivative, and the like, but known conductive additives may be appropriately selected as the conductive additive, without being limited thereto.

The energy storage system of the present invention may comprise 10 to 200 parts by weight of the conductive additive with respect to 100 parts by weight of the metal-organic framework. For another example, the energy storage system of the present invention may comprise 20 or more parts by weight of the conductive additive, 30 or more parts by weight of the conductive additive, 40 or more parts by weight of the conductive additive, 50 or more parts by weight of the conductive additive, 60 or more parts by weight of the conductive additive, 70 or more parts by weight of the conductive additive, 80 or more parts by weight of the conductive additive, 90 or more parts by weight of the conductive additive, or 100 or more parts by weight of the conductive additive with respect to 100 parts by weight of the metal-organic framework, and otherwise, it may comprise 190 or less parts by weight of the conductive additive, 180 or less parts by weight of the conductive additive, 170 or less parts by weight of the conductive additive, 160 or less parts by weight of the conductive additive, 150 or less parts by weight of the conductive additive, 140 or less parts by weight of the conductive additive, 130 or less parts by weight of the conductive additive, 120 or less parts by weight of the conductive additive, or 110 or less parts by weight of the conductive additive with respect to 100 parts by weight of the metal-organic framework.

The energy storage system of the present invention may have, for example, an initial discharge capacity at 0.2 C of 300 mAhg$^{-1}$ or more. For another example, the initial discharge capacity at 0.2 C may be 310 mAhg$^{-1}$ or more, 320 mAhg$^{-1}$ or more, 330 mAhg$^{-1}$ or more, 340 mAhg$^{-1}$ or more, 350 mAhg$^{-1}$ or more, 360 mAhg$^{-1}$ or more, 370 mAhg$^{-1}$ or more, 380 mAhg$^{-1}$ or more, 390 mAhg$^{-1}$ or more, 400 mAhg$^{-1}$ or more, 410 mAhg$^{-1}$ or more, 420 mAhg$^{-1}$ or more, 430 mAhg$^{-1}$ or more, 440 mAhg$^{-1}$ or more, 450 mAhg$^{-1}$ or more, 460 mAhg$^{-1}$ or more, 470 mAhg$^{-1}$ or more, 480 mAhg$^{-1}$ or more, 490 mAhg$^{-1}$ or more, 500 mAhg$^{-1}$ or more, 510 mAhg$^{-1}$ or more, 520 mAhg$^{-1}$ or more, 530 mAhg$^{-1}$ or more, 540 mAhg$^{-1}$ or more, 550 mAhg$^{-1}$ or more, 560 mAhg$^{-1}$ or more, 570 mAhg$^{-1}$ or more, 580 mAhg$^{-1}$ or more, 590 mAhg$^{-1}$ or more, 600 mAhg$^{-1}$ or more, 610 mAhg$^{-1}$ or more, 620 mAhg$^{-1}$ or more, 630 mAhg$^{-1}$ or more, 640 mAhg$^{-1}$ or more, 650 mAhg$^{-1}$ or more, 660 mAhg$^{-1}$ or more, 670 mAhg$^{-1}$ or more, 680 mAhg$^{-1}$ or more, 690 mAhg$^{-1}$ or more, 700 mAhg$^{-1}$ or more, or 710 mAhg$^{-1}$ or more, and otherwise, it may be 1000 mAhg$^{-1}$ or less, 950 mAhg$^{-1}$ or less, 900 mAhg$^{-1}$ or less, 850 mAhg$^{-1}$ or less, 800 mAhg$^{-1}$ or less, or 750 mAhg$^{-1}$ or less. The initial discharge capacity at 0.2 C may be measured according to the estimation examples as will be discussed later.

The energy storage system of the present invention may have, for example, a reversible specific capacity at 0.2 C of 300 mAhg$^{-1}$ or more. According to the present invention, the term, the reversible specific capacity may mean a specific capacity after n cycles (wherein n is an integer from 1 through 1000). For another example, the reversible specific capacity at 0.2 C may be 405 mAhg$^{-1}$ or more, 410 mAhg$^{-1}$ or more, 415 mAhg$^{-1}$ or more, 420 mAhg$^{-1}$ or more, 425 mAhg$^{-1}$ or more, 430 mAhg$^{-1}$ or more, 435 mAhg$^{-1}$ or more, or 440 mAhg$^{-1}$ or more, and otherwise, it may be 800 mAhg$^{-1}$ or less, 750 mAhg$^{-1}$ or less, 700 mAhg$^{-1}$ or less, 650 mAhg$^{-1}$ or less, 600 mAhg$^{-1}$ or less, 550 mAhg$^{-1}$ or less, 500 mAhg$^{-1}$ or less, or 450 mAhg$^{-1}$ or less. The reversible specific capacity at 0.2 C may be measured according to the estimation examples as will be discussed later.

The energy storage system of the present invention may increase the specific capacity if the number of cycles increases. In general energy storage systems, if the number of cycles increases, the specific capacity decreases owing to various reasons such as deterioration of the electrode active material. However, the energy storage system of the present invention may have the metal-organic framework with the above-mentioned properties as the electrode active material, and unlike the conventional energy storage systems, accordingly, the specific capacity may increase if the number of cycles increases. The reason may not be clearly revealed, but it is considered that the properties are improved because the oxidation/reduction properties of the metal-organic framework are improved with the development of charging/discharging processes. For example, the metal-organic framework of the present invention changes the oxidation states of the metal ions by the special structures as the charging/discharging are developed and thus increases the capacities of the metals for receiving electrons and/or the transfer speeds of the electrons. For another example, —S— of the organic ligands of the metal-organic framework of the present invention is oxidized and reduced as the charging/discharging are developed and thus increases the capacities of the metals and/or the transfer speeds of the electrons.

The energy storage system of the present invention may have, for example, Coulombic efficiency of 70% or more. The Coulombic efficiency may be measured according to the estimation examples as will be discussed later. For another example, the Coulombic efficiency may be 72% or more, 74% or more, 76% or more, 78% or more, 80% or more, 82% or more, 84% or more, 86% or more, 88% or more, 90% or more, 92% or more, 94% or more, or 96% or more, and otherwise, it may be 99.5% or less, 99% or less, 98.5% or less, or 98% or less. However, it may not be limited thereto.

In the energy storage system of the present invention, the slurry layer may further include, for example, a binder, and/or an additive. The binder may be one or more materials selected from the group consisting of CMC (Carboxymethylcellulose), PVA (Polyvinyl alcohol), PVDF (Polyvinyliene fluoride), PVP (Polyvinylpyrrolidone), and MC (Methyl cellulose). The slurry layer may include an additive needed appropriately according to the purpose of a capacitor, a secondary battery, or the like.

For example, 0.1 to 100 parts by weight of the binder may be present with respect to 100 parts by weight of the metal-organic framework. For another example, 0.5 or more parts by weight of the binder, 1 or more parts by weight of the binder, 1.5 or more parts by weight of the binder, 2 or more parts by weight of the binder, 2.5 or more parts by weight of the binder, 3 or more parts by weight of the binder, 3.5 or more parts by weight of the binder, 4 or more parts by weight of the binder, 4.5 or more parts by weight of the binder, 5 or more parts by weight of the binder, 5.5 or more parts by weight of the binder, or 6 or more parts by weight of the binder may be present with respect to 100 parts by weight of the metal-organic frameworks, and otherwise, 90 or less parts by weight of the binder, 80 or less parts by weight of the binder, 70 or less parts by weight of the binder, 60 or less parts by weight of the binder, 50 or less parts by weight of the binder, 40 or less parts by weight of the binder, 30 or less parts by weight of the binder, 20 or less parts by weight of the binder, or 10 or less parts by weight of the binder may be present with respect to 100 parts by weight of the metal-organic frameworks. Without being limited thereto, the binder may be appropriately determined according to uses or purposes. The energy storage system of the present invention may further have, for example, a current collector. For example, the current collector may be a cathode current collector or an anode current collector, and the cathode current collector or the anode current collector may be prepared according to known general methods or methods modified from the known methods, without specially limited thereto. The cathode current collector may be limited particularly only if it does not cause chemical changes in a battery and it has conductivity. For example, the cathode current collector may be made of stainless steel, aluminum, nickel, titan, baked carbon, or carbon, nickel, titan, or silver treated on surface of aluminum or stainless steel. The cathode current collector may form micro concaves and convexes on the surface thereof to enhance adhesion force of the cathode active material, and the cathode current collector may be provided in the form of a film, a sheet, a foil, a net, a porous body, a foam body, a non-woven fabric, and the like. For example, the anode current collector may be made of copper, stainless steel, aluminum, nickel, titan, baked carbon, an aluminum-cadmium alloy, or carbon, nickel, titan, or silver treated on surface of cooper or stainless steel. In the same manner as the cathode current collector, the anode current collector may form micro concaves and convexes on the surface thereof to enhance adhesion force of the anode active material, and the anode current collector may be provided in the form of a film, a sheet, a foil, a net, a porous body, a foam, a non-woven fabric, and the like. The anode current collector may be limited particularly only if it does not cause chemical changes in a battery and it has conductivity.

The energy storage system of the present invention may further have, for example, an electrolyte. For example, the electrolyte may be an organic liquid electrolyte, an inorganic liquid electrolyte, a gel polymer electrolyte, a solid polymer electrolyte, a solid inorganic electrolyte, or a melting inorganic electrolyte, but it may not be limited thereto.

The energy storage system of the present invention may further have, for example, a separator film. The separator film may be a uniaxially and/or biaxially drawn polypropylene, polyethylene, and/or polyolefin, but it may not be limited thereto. Known separator films may be appropriately selected as the separator film.

The energy storage system of the present invention may be, for example, a supercapacitor, a secondary battery, or an energy storage system (ESS).

Hereinafter, embodiments of the present invention will be explained, but it should be appreciated that the scope of the present invention includes the embodiments of the present invention, while being not limited thereby.

Embodiment 1. 1D MOF

Step 1. Manufacturing Step of 6,13-Difluorobenzo [5,6][1,4]dithiino[2,3-b]thianthrene

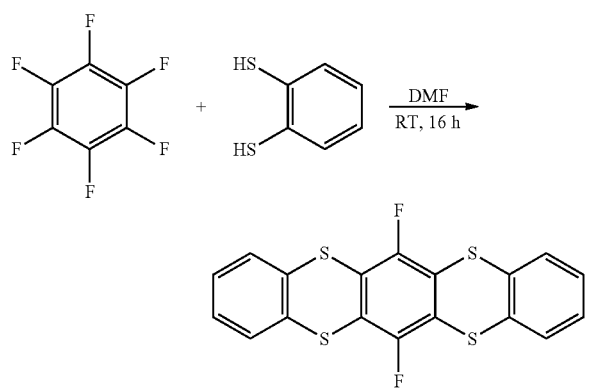

According to a method reported on Nat. Chemistry, 2018, 10, 1023, 6,13-Difluorobenzo[5,6][1,4]dithiino2,3-b]thianthrene was manufactured.

Step 2. Manufacturing Step of 2,3,9,10-Tetra-Bromo-6,13-Difluorobenzo[5,6][1,4]dithiino[2,3-b] thianthrene

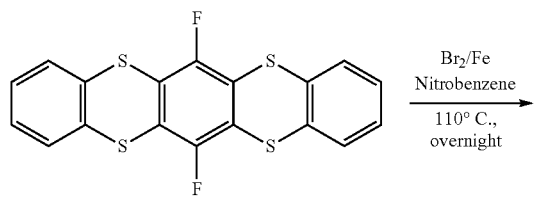

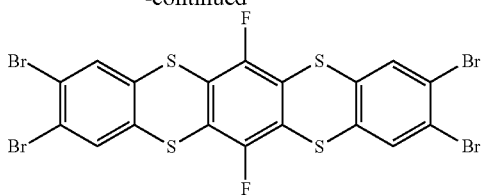

The 6,13-Difluorobenzo[5,6][1,4]dithiino2,3-b]thianthrene(200 mg, 0.512 mmol) manufactured at step 1 and Fe powder (10 mg, 0.184 mmol) were poured in a nitrobenzene solvent (10 ml) to prepare a solution. Next, bromine ($Br_2$) (158.6 uL, 3.07 mmol) was added dropwise to the solution for one minute and agitated to a temperature of 110° C. overnight to prepare a mixed liquid. The mixed liquid was cooled to a room temperature and then mixed with diethyl ether (100 ml). As a result, crude off white solids, 2,3,9,10-TetraBromo-6,13-Difluorobenzo[5,6][1,4]dithiino[2,3-b] thianthrene was produced.

Step 3. Manufacturing Step of N,N',N'',N'''-(6,13-difluorobenzo[5,6][1,4]dithiino[2,3-b]thianthrene-2, 3,9,10-tetrayl)tetrakis(1,1-diphenylmethanimine)

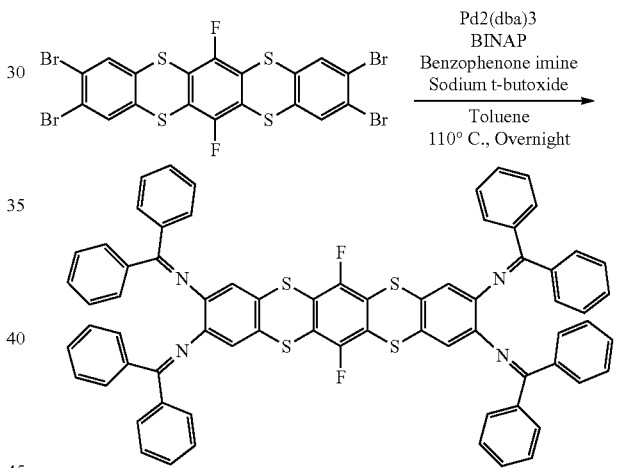

Tris(dibenzylideneacetone)dipalladium (Pd2 (dba) 3)) (88.85 mg, 0.097 mmol) and rac-BINAP (120.75 mg, 0.194 mmol) were poured into a toluene solution (30 ml) to produce a mixed liquid. The mixed liquid was subjected to degassing in a freezing-pumping-defrosting cycle three times, purging with Ar, and agitating at a temperature of 110° C. for 30 minutes. Next, the agitated liquid was cooled at a room temperature, and benzophenone imine) (508 ul, 3.02 mmol), 2,3,9,10-TetraBromo-6,13-Difluorobenzo[5,6] [1,4]dithiino[2,3-b]thianthrene (375 mg, 0.388 mmol) produced at step 2, and sodium t-butoxide (1.516 g, 15.77 mmol) were added to the mixed liquid and agitated at a temperature of 110° C. overnight.

Next, the mixed liquid was cooled at a room temperature, diluted with $CH_2Cl_2$, filtered through a cellite pad, and evaporated and dried. After that, the remaining material passed through a column chromatography on silica gel by using an eluent (DMC/hexane (volume ratio 1:4 (DMC): (hexane))). A first fraction was collected, evaporated, and dried to obtain yellow solids (2.001 g, 1.53 mmol) with a yield of 60%.

Step 4. Manufacturing Step of 6,13-difluorobenzo[5,6][1,4]dithiino[2,3-b]thianthrene-2,3,9,10-tetraamine(TITH)

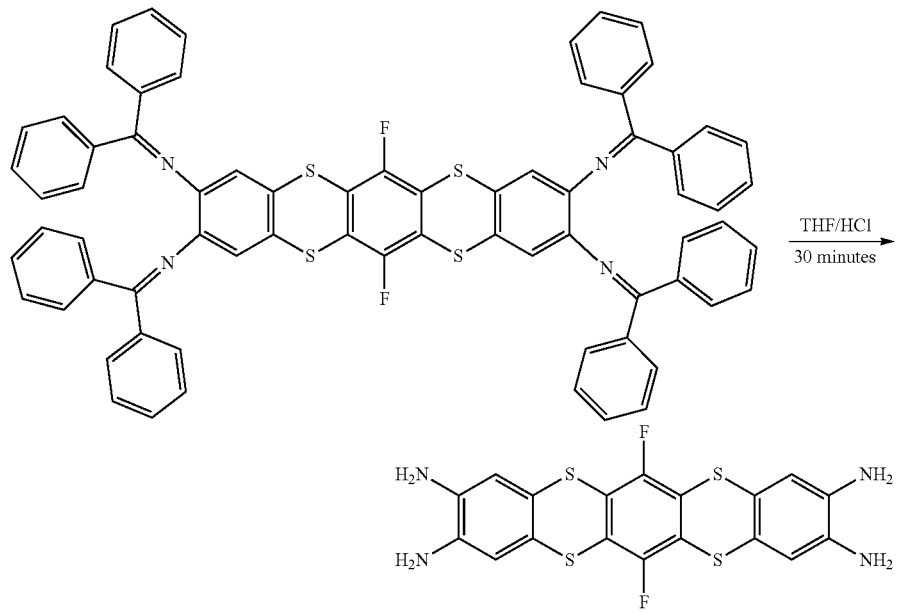

The N,N',N",N'''-(6,13-difluorobenzo[5,6][1,4]dithiino[2,3-b]thianthrene-2,3,9,10-tetrayl)tetrakis(1,1-diphenylmethanimine) (0.219 g, 0.17 mmol) manufactured at step 3 was poured into a THF solution (10 ml), 2.0M HCl water solution (0.5 ml, 1.0 mmol) was added to a mixed material, and the mixed material was agitated at a room temperature. Next, the mixed material was subjected to centrifugation for 30 minutes to separate a precipitated material therefrom, and the precipitated material was cleaned with hexane(5.0 ml*3) and dried at a vacuum state to bright yellow solids, 6,13-difluorobenzo[5,6][1,4]dithiino[2,3-b]thianthrene-2,3,9,10-tetraamine (0.076 g, 0.14 mmol). ESI-MS: m/z calculated for $[M+H]^+$ $C_{18}H_{12}F_2N_4S_4$: 450.9999; found: 451.0005.

Step 5. Manufacturing Step of 1D-MOF

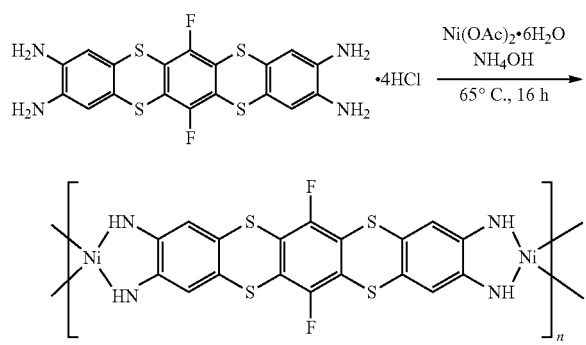

DMF (5 ml) was poured into Ni(OAc)$_2$·6H$_2$O (50 mg, 0.080 mmol) and melted to produce a solution, and 6,13-difluorobenzo[5,6][1,4]dithiino[2,3-b]thianthrene-2,3,9,10-tetraamine (20 mg, 0.033 mmol) manufactured at step 4 was added to the solution. Next, 25 to 30% ammonia solution (200 uL) was added to the solution, and the mixed material was agitated at a temperature of 60 to 70° C. under air atmosphere overnight.

As a result, a dark blue precipitated material was produced. The precipitated material was subjected to centrifugation to separate solids therefrom. The solids were cleaned with water and acetone three times. Next, the cleaned solids were dried at a temperature of 100° C. under a vacuum state overnight to obtain 1D-MOF particles with a yield of 30%.

Estimation Example 1. Scanning Electron Microscope (SEM) and Transmission Electron Microscope (TEM)

SEM images and SEM-EDS images of the 1D MOF particles according to the first embodiment of the present invention were produced by using an SEM (S-4800, Hitachi). Further, TEM images and TEM-EDS images of the 1D MOF particles according to the first embodiment of the present invention were produced by using a TEM (Tecnai F20, FEI).

Figure 2:
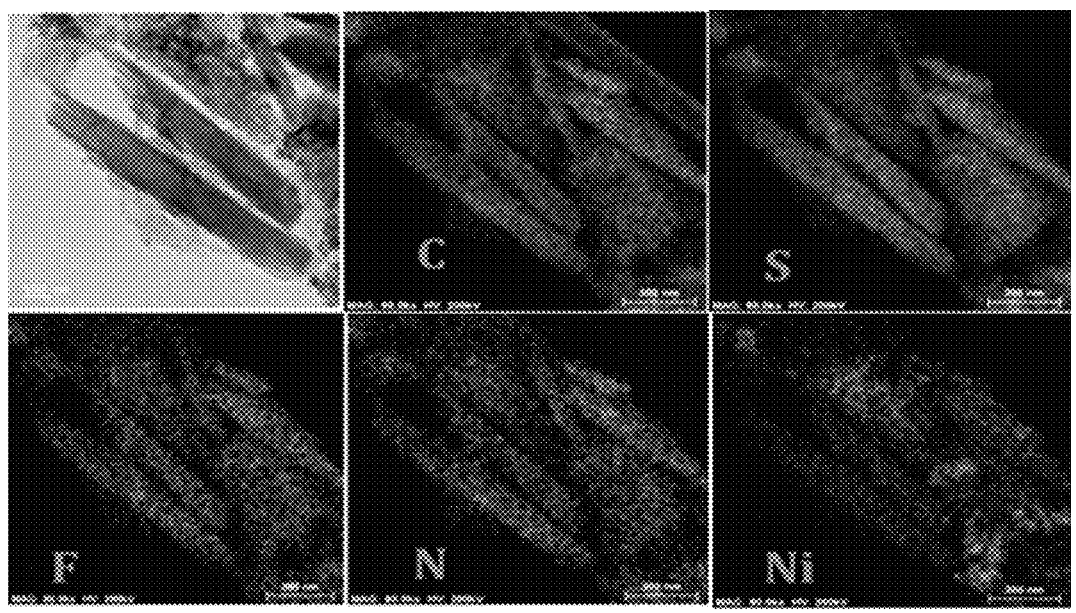
FIG. 2 shows TEM and TEM-EDS images of the 1D MOF according to the first embodiment of the present invention.

As a result, as shown in FIG. 1 (showing SEM images and SEM-EDS images) and FIG. 2 (showing TEM images and TEM-EDS images), the 1D MOF particle, which has a bar-like crystal shape with a length of about 200 nm and a width of about 20 to 40 nm, were observed. According to Bravais-Friedel-Donnay-Harker (BFDH) law, the bar-like shape may be resulted from interaction of π-π molecules of TITH molecules. After the EDS analysis of the 1D MOF particle, further, it was found that Ni, C, S, F, and N elements are uniformly distributed.

Estimation Example 2. Powder X-Ray Diffraction (PXRD)

The analysis for the 1D MOF particle according to the first embodiment of the present invention was performed by using PXRD (MiniFlex 600, Rigaku). In this case, the PXRD was set on the conditions of Cu Kα (λ=1.5418 Å), 40 kV, and 40 mA.

Figure 3:
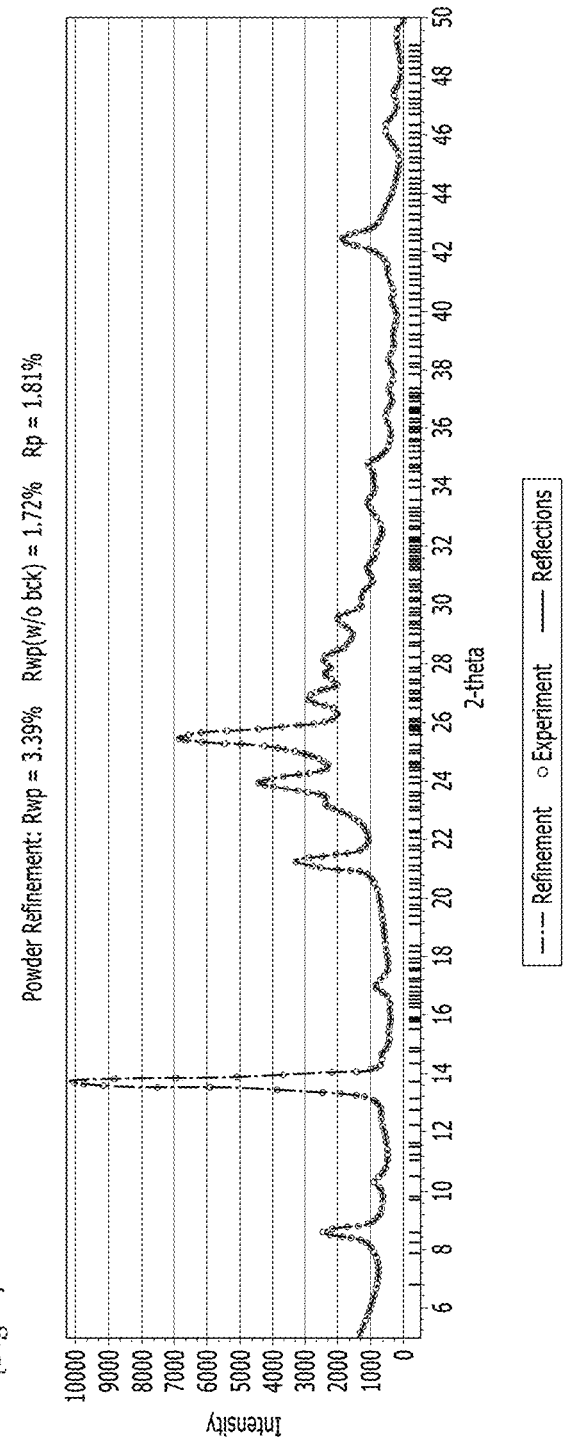
FIG. 3 is a graph showing PXRD analysis results of the 1D MOF according to the first embodiment of the present invention.

After the analysis using the PXRD, as shown in FIG. 3, high peaks were generated at 2-theta values of 8.2°, 13.7°, 21.2°, 23.8°, 25.4°, 27.0°, and 40.5°.

Figure 4:
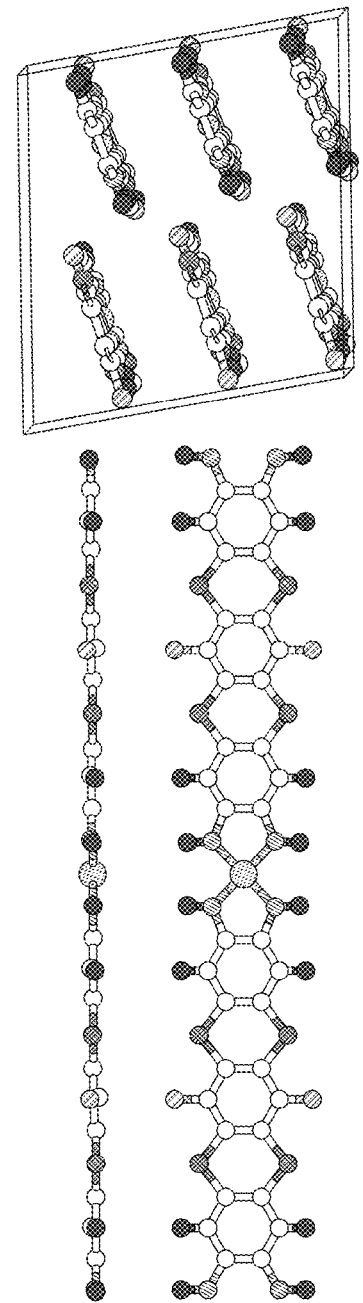
FIG. 4 shows crystal structure simulation results after the structure of the 1D MOF according to the present invention is optimized through DFT.

Further, after the structure of the 1D MOF was optimized through the calculation of Density Functional Theory (DFT), crystal structure simulation of the 1D MOF structure was performed, and as a result, the crystal structure had lattice parameters of a=18.3083 Å, b=13.0655 Å, c=20.1072 Å, α=95.8843°, β=34.5212°, and γ=91.8878 and P1 space groups (See FIG. 4).

Estimation Example 3. Solid (Nuclear Magnetic Resonance) NMR

The analysis for the 1D MOF particle according to the first embodiment of the present invention was performed by using an NMR spectroscopy (Fourier 300, Bruker) through an MAS (Magic-Angle Spinning) technique.

Figure 5:
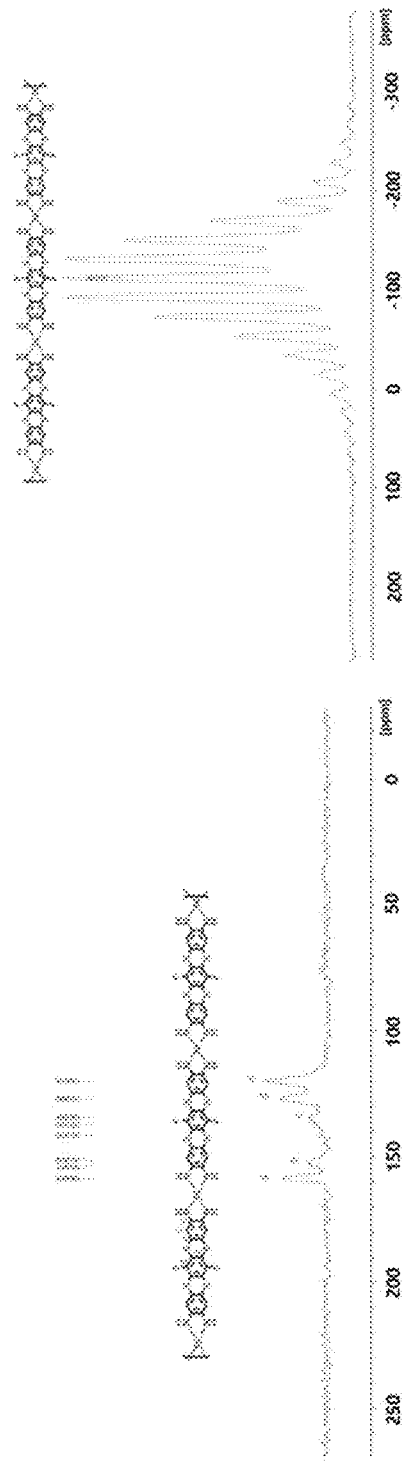
FIGS. 5A and 5B are graphs showing NMR analysis results for the 1D MOF according to the first embodiment of the present invention.

As a result, as shown in FIGS. 5A and 5B, it could be checked that five main $^{13}C$ signals (153.34 ppm, 158.49 ppm, 134.44 ppm, 126.90 ppm, and 119.61 ppm) were seen at 119.20 to 158.49 ppm and one $^{19}F$ signal was seen at −113.20 ppm.

Estimation Example 4. Fourier-Transform Infrared Spectroscopy (FT-IR)

Transmittance (%) with respect to wavelength ($cm^{-1}$) for the 1D MOF particles according to the first embodiment of the present invention was measured by using an FT-IR (ALPHA-P, Bruker).

Figure 6:
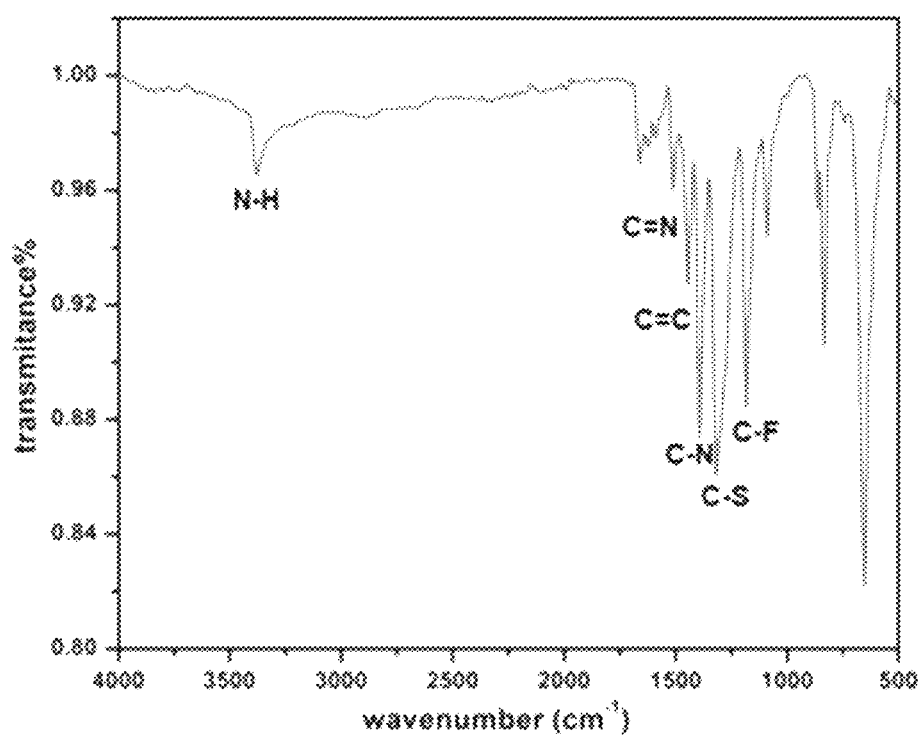
FIG. 6 is a graph showing FT-IR analysis results for the 1D MOF according to the first embodiment of the present invention.

As a result, as shown in FIG. 6, absorption peaks of C—S, C—F, and C—N of 6,13-difluorobenzo[5,6][1,4]dithiino[2,3-b]thianthrene-2,3,9,10-tetraamine as well as an absorption peak of NH group bonded to Ni at 3382 $cm^{-1}$ were observed.

Estimation Example 5. X-Ray Photoelectron Spectroscopy (XPS)

Analysis for the 1D MOF particle according to the first embodiment of the present invention was performed by using an XPS (K-alpha, Thermo VG Scientific).

Figure 7:
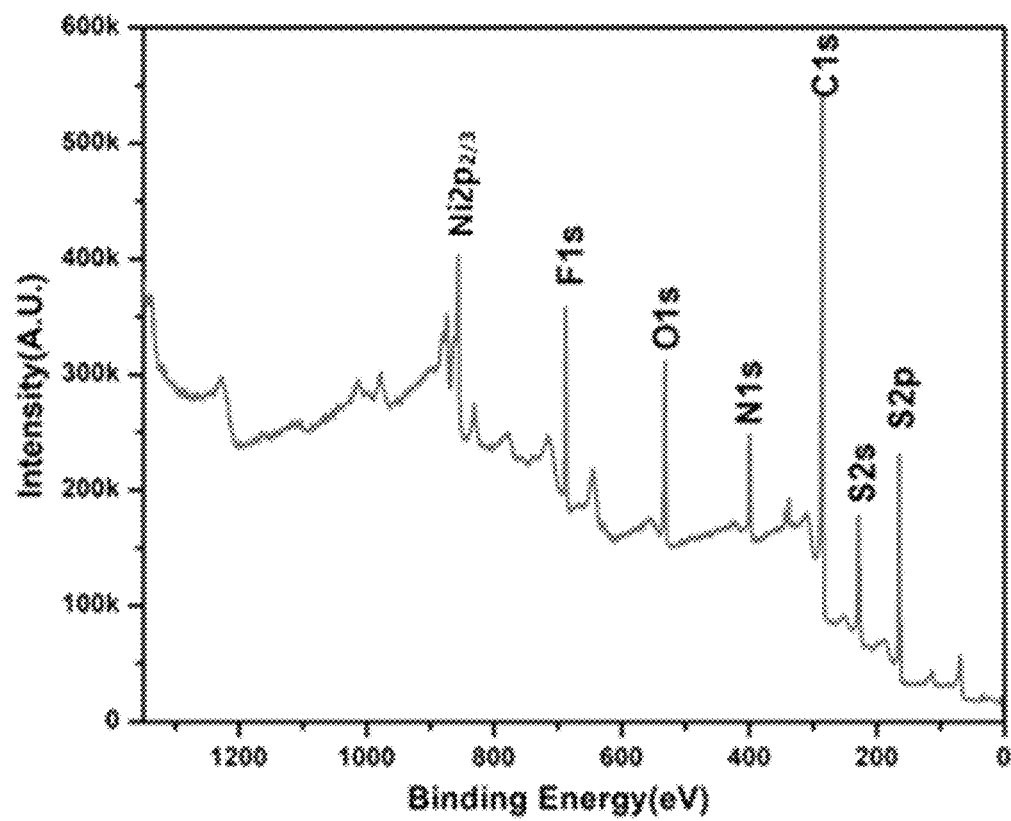
FIG. 7 is a graph showing XPS analysis results for the 1D MOF according to the first embodiment of the present invention.

As a result, as shown in FIG. 7, it was checked that Ni, F, O, N, C, and S elements existed. Further, it was checked that Ni (II) was oxidized through two clear peaks of 855.17 eV and 873.29 eV for $Ni2p_{3/2}$ and $Ni2p_{1/2}$.

Estimation Example 6. X-Ray Absorption Near Edge Structure (XANES)

Figure 8:
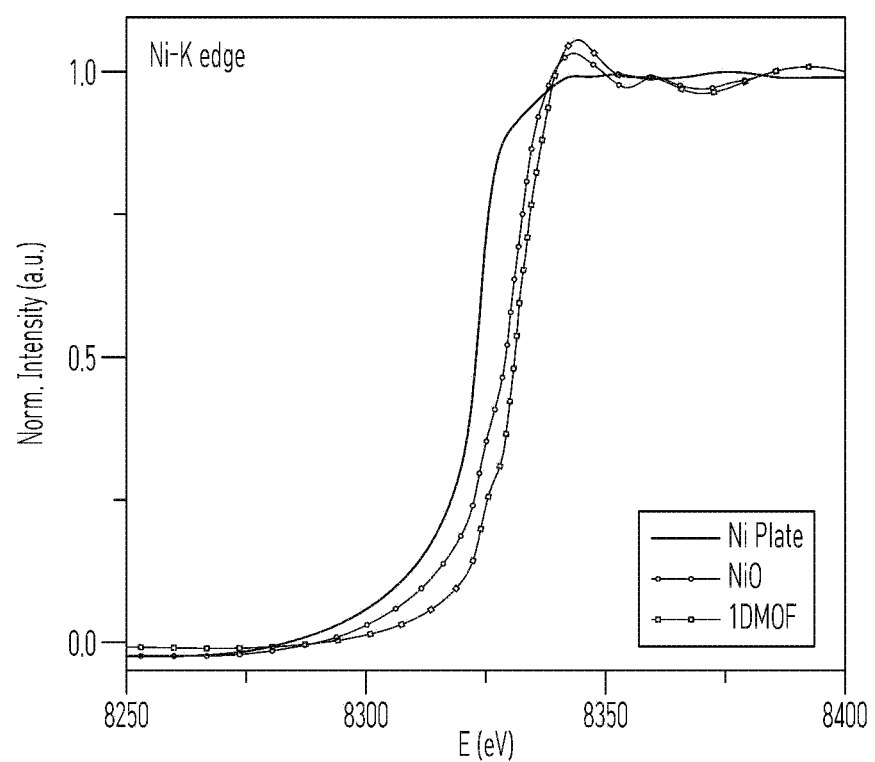
FIG. 8 is a graph showing XANES measurement results for the 1D MOF according to the first embodiment of the present invention.

An oxidized state of Ni existing in the 1D MOF particle according to the first embodiment of the present invention was checked by using an XANES (Pohang Accelerator Laboratory (PAL) 1D beamline). As a result, as shown in FIG. 8, it was checked that Ni had the same oxidized state as a standard material NiO at 8340 eV.

Estimation Example 7. Extended X-Ray Absorption Fine Structure (EXAFS)

Figure 9:
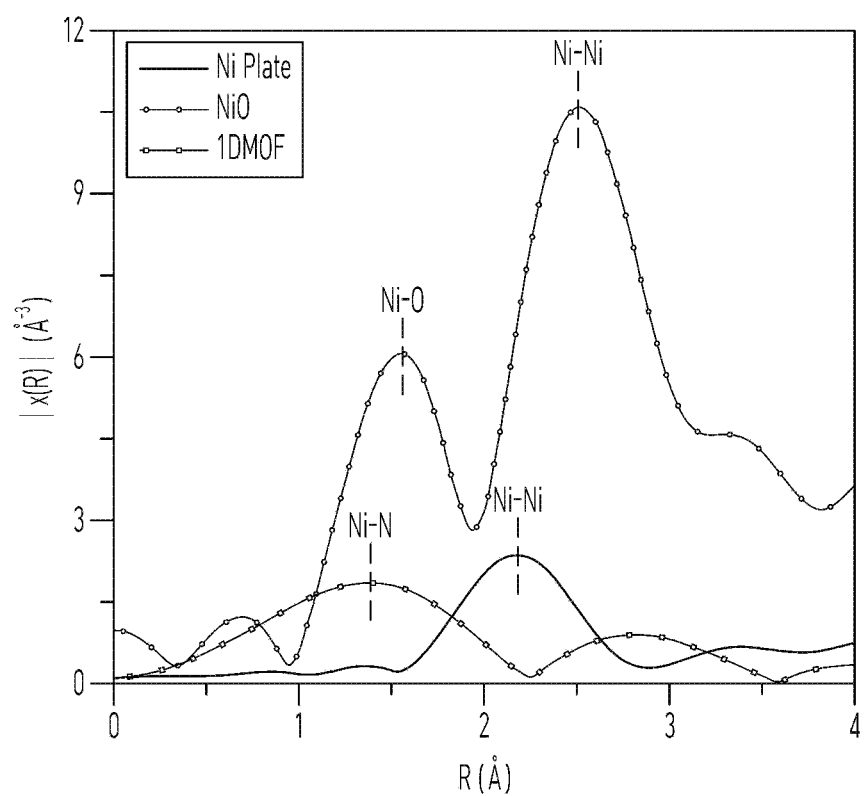
FIG. 9 is a graph showing EXAFS measurement results for the 1D MOF according to the first embodiment of the present invention.

The coordination number of Ni and the elements coordinated around Ni for the 1D MOF particle according to the first embodiment of the present invention were found by using an EXAFS (Pohang Accelerator Laboratory (PAL) 1D beamline). As a result, as shown in FIG. 9, it was checked that Ni—N bonding having 4.2 numbers (bonding distance of 2.143 Å) at 1.1 A was found.

Embodiment 2. Coin Cell

An anode slurry composition was applied by drop casting on a Cu foil with a thickness of 18 μm to manufacture an anode mixture layer (with a thickness of 30 μm). In this case, the anode slurry composition was prepared by mixing the 1D MOF particle according to the first embodiment of the present invention, a conductive additive (Super-P, Timcal), and a binder (PVDF, Kureha) in the weight ratio of 47:50:3 (anode active material:conductive additive:binder).

Next, one surface of a separator film (Glass microfiber filter, Whatman) with a thickness of 500 μm was laminated on the anode mixture layer, and the other surface was laminated on a Li foil with a thickness of 45 μm.

After that, an EC/DMC (weight ratio 1:1 (EC:DMC)) solution containing LiPF6 of 1 M was poured into the anode mixture layer to manufacture a coin cell.

Estimation Example 8. Cyclic Voltammetry

The properties of the coin cell according to the second embodiment of the present invention were estimated through cyclic voltammetry. They were measured at a voltage in the range of 0.01 to 3.0 V by using cyclic voltammetry (VSP of a BioLogic company).

Figure 10:
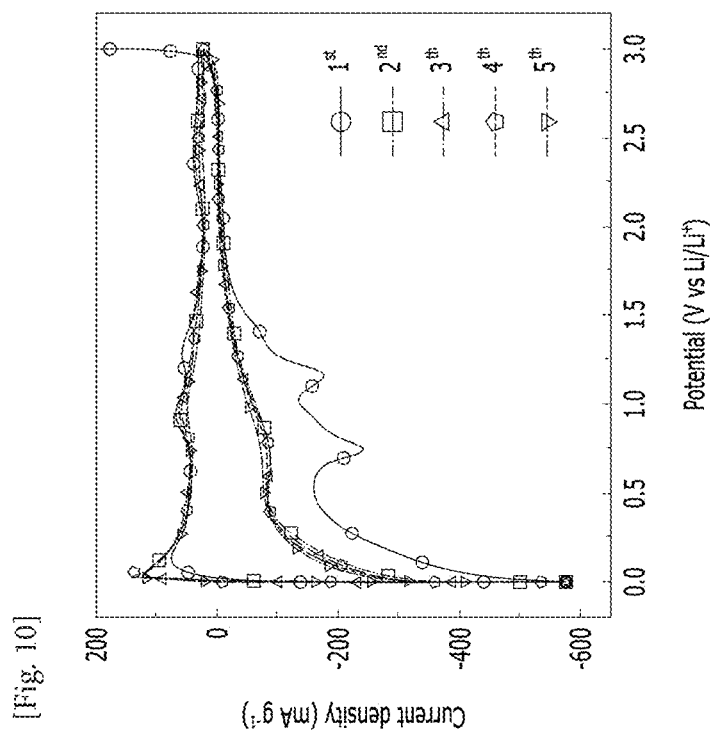
FIG. 10 is a graph showing cyclic voltammetry measurement results for a coin cell according to a second embodiment of the present invention.

As a result, as shown in FIG. 10, it was checked that a non-reversible reaction was generated at initial discharging of an anode mode.

In a first cycle of cathode potential scan, two reduction peaks at 1. 15 and 0.74 V and two oxidation peaks at 1.32 and 0.96 V with respect to $Li/Li^+$ were generated. In specific, it was checked that the two reduction peaks on the first cathode potential scan disappeared on second cathode potential scan. The reason why a difference occurred between the first scan and the second scan was that hydrogen and lithium bonded to Solid Electrolyte Interphase (SEI) and nitrogen are substituted by each other.

It was checked that two oxidation peaks at anode potential scan were generated in the process of de-lithiation of the ID MOF. After that, it was checked that the anode potential was maintained on a second CV curve in a semi-reversible, stable manner.

Estimation Example 9. Galvanostatic Charge-Discharge Properties

Galvanostatic charge-discharge properties of the coin cell according to the second embodiment of the present invention were estimated. The Galvanostatic charge-discharge properties were measured by using the VSP of the BioLogic company, and they were measured up to $10^{th}$ cycle at a current density of 113 mA/g (0.2 C).

Figure 11:
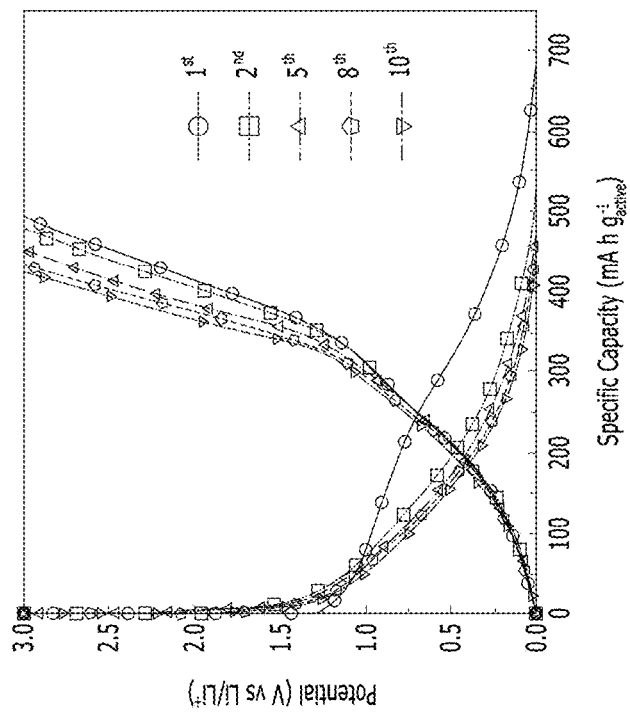
FIG. 11 is a graph showing estimation results of galvanostatic charge-discharge properties of the coin cell according to the second embodiment of the present invention.

As a result, a graph as shown in FIG. 11 was provided. It could be appreciated that an initial discharge capacity of 713 $mAhg^{-1}$ and a re-charge capacity of 478 $mAhg^{-1}$ appeared. This was similar to the cyclic voltammetry of the estimation example 8, and because of the formation of SEI layer, the discharge capacity values on some initial cycles were high. After the $10^{th}$ cycle, the Coulombic efficiency was near to 96% and reversible specific capacity of 443 $mAhg^{-1}$ appeared.

Estimation Example 10. Rate Capability Properties

Charge and discharge properties at various C-rates of the coin cell according to the second embodiment of the present invention were estimated by using the VSP of the BioLogic company.

Figure 12:
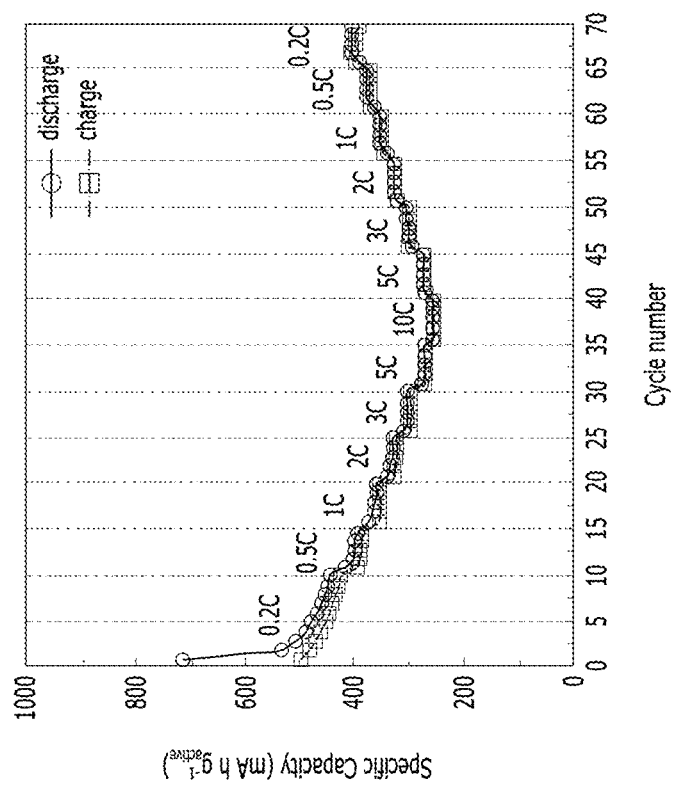
FIG. 12 is a graph showing estimation results of charge-discharge properties at various C-rates of the coin cell according to the second embodiment of the present invention.

As a result, as shown in FIG. 12, it was checked that discharge capacities of 443, 394, 358, 329, 303, 274, and 256 mAhg$^{-1}$ appeared at the rates of 0.2, 0.5, 1, 2, 5, and 10 C every fourth cycle. After 70 cycles, further, it was checked that the restoration to the specific capacity of 394 mAhg$^{-1}$ appeared after the current density of 0.2 C was charged and discharged, and the Coulombic efficiency of 98% was generated.

Estimation Example 11. Lifespan Properties

Figure 13:
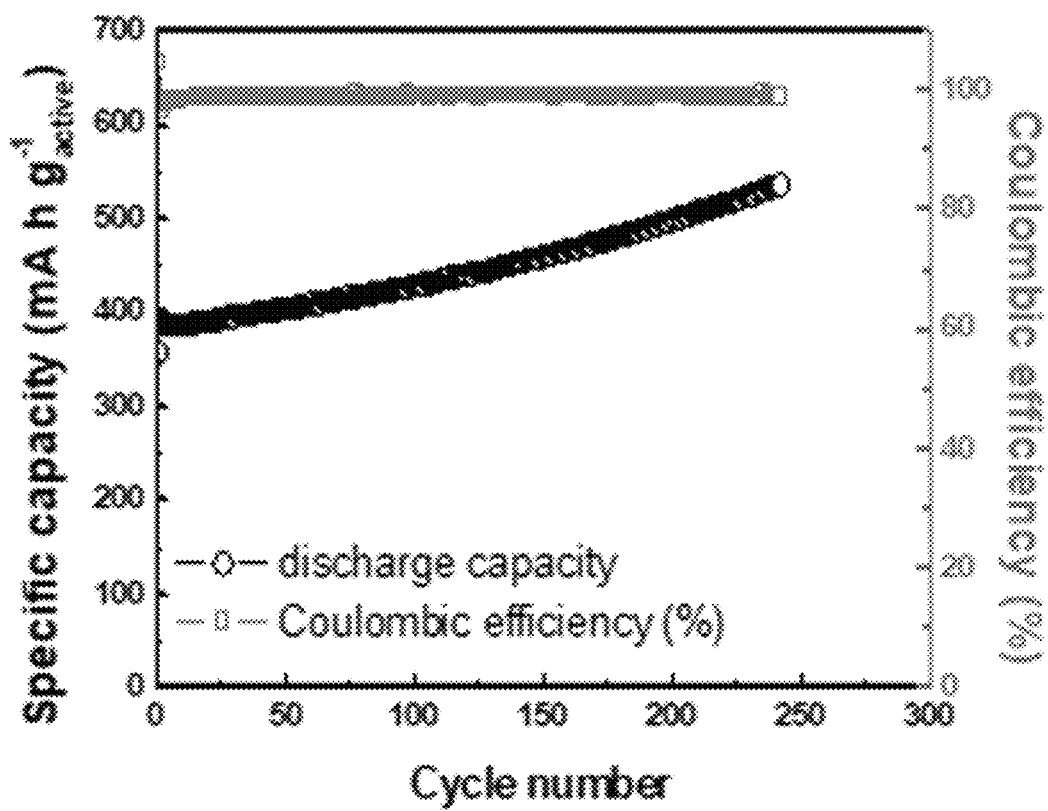
FIG. 13 is a graph showing lifespan properties of the coin cell according to the second embodiment of the present invention.

Lifespan properties of the coin cell according to the second embodiment of the present invention were estimated by using the VSP of the BioLogic company on conditions of 0.5 C and 200 mAg$^{-1}$. As a result, as shown in FIG. 13, a very interesting phenomenon that the specific capacities remarkably increased during cycles was generated. It was considered that such specific capacity increase resulted from the formation of phases with high conductivity during initial lithiation.

Estimation Example 12. Staircase Potentio Electrochemical Impedance Spectroscopy (SPEIS)

To electrochemically check whether the resistance of electrodes upon charging/discharging was improved for the coin cell according to the second embodiment of the present invention, a test using Staircase Potentio Electrochemical Impedance Spectroscopy (SPEIS) was performed. The test was carried out by using the VSP of the BioLogic company.

As a result, a high frequency semicircle on lithium metal of coin cell (half-cell) at an initial state (open circuit voltage of 2.6 V) and a large low frequency semicircle of an anode appeared in Nyquist plot (See FIGS. 14A and 14C). As the potentials gradually decreased through the first discharge, the low frequency semicircle substantially decreased, which meant that the charge transfer resistance of anode was lowered.

Further, it was checked that a linear region of 45° was more clearly found in Nyquist plot during the charging process from 0.01 to 3.0 V (See FIGS. 14B and 14D). It was appreciated therefrom that Warburg coefficient relating to the diffusion in particle increased. As the Warburg coefficient increased, the diffusion coefficient inversely proportional to Warburg coefficient decreased, and it was appreciated therefrom that the diffusion coefficient decreased in the process of the de-lithiation. As the charging and discharging developed, the ID MOF particle gradually formed the phase having high conductivity, so that the specific capacities increased in the cycle properties.

Estimation Example 12. Low Temperature Electrochemical Performance

Various low temperature electrochemical performance of the ID MOF electrode was investigated through CV measurement, constant current discharge-charge, rate performance, and cycling test (See FIGS. 16A to 16D).

Figure 16A:
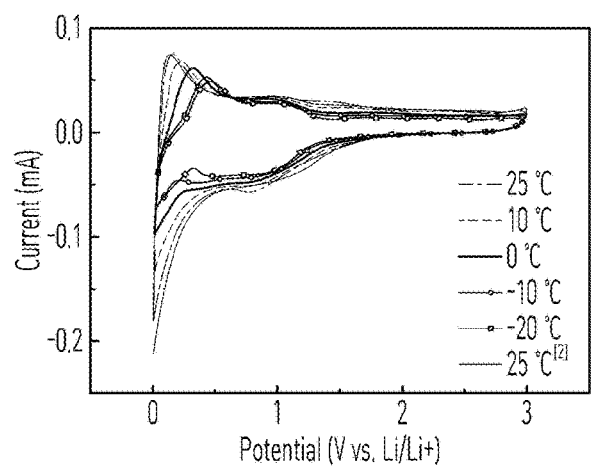

FIG. 16A shows CV curves at various temperatures in the range of 25 to −20° C. that are obtained at a scan rate of 0.1 mV s−1 with the potential range of 0.01-3.0 V vs Li/Li+). At 25° C., the curve showed two pairs of anode/cathode peaks. As the temperature was lowered, the anode peak disappeared in the potential range of 1.4V vs Li/Li+, and the anode peak in the potential range of 0.79V vs Li/Li+ moved to that in the potential range of 0.87V vs Li/Li+. Further, the cathode peak showed the similar results to the anode peak. While the temperature decreased, the cathode peak disappeared in the potential range of 1.41V vs Li/Li+, and the cathode peak in the potential range of 0.96V vs Li/Li+ moved to that in the potential range of 1.01V vs Li/Li+. As a result, one pair of anode/cathode peaks still existed at a temperature from 0 to −20° C.

Figure 16B:
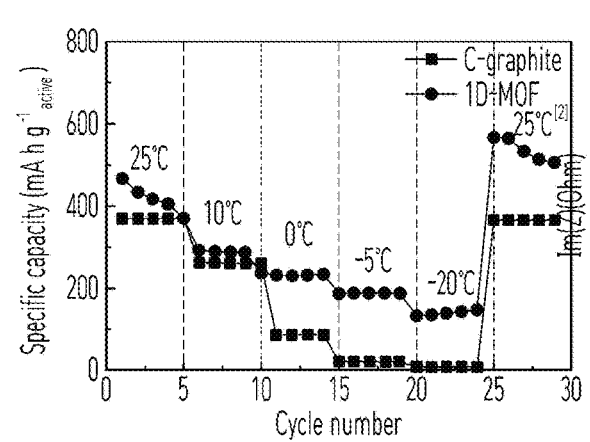

FIG. 16B shows discharge capacities of the 1D MOF and commercial graphite (C-graphite, XFH New Energy Materials Co., Ltd) at various temperatures in the range of 25 to −20° C. and a current density of 0.2 C. The 1D-MOF discharge capacity was 407.16 mAhg−1 at a temperature of 25° C., 289.81 mAhg−1 at a temperature of 10° C., 236.19 mAhg−1 at a temperature of 0° C., 191.38 mAhg−1 at a temperature of −10° C., and 150.30 mAhg−1 at a temperature of −20° C. (which were 71.2%, 58.0%, 47.9%, and 36.9% of the capacity thereof). On the same conditions, the C-graphite discharge capacity was 370.7 mAhg−1 at a temperature of 25° C., 264.8 mAhg−1 at a temperature of 10° C., 90.1 mAhg−1 at a temperature of 0° C., 22.4 mAhg−1 at a temperature of −10° C., and 28.6 mAhg−1 at a temperature of −20° C. (which were 71.4%, 24.3%, 6.0%, and 2.3% of the capacity thereof). The discharge capacity of the C-graphite was more remarkably lowered than that of ID-MOF at low temperatures (<−10° C.). In specific, the discharge capacity of the 1D MOF was higher by five times or more than that of the C-graphite at a temperature of −20° C. Further, the 1D MOF still showed excellent specific capacity (of 508.46 mAhg−1 on 0.2 C) when increased again to a temperature of 25°.

Because of poor dynamic conditions of a lithium ion battery at low temperatures, a lithium insertion speed of graphite decreased to generate lithium metal precipitation on the surface of graphite, and the capacity of graphite was greatly reduced. This result showed that the 1D-MOF had more excellent low temperature cycle capacity maintaining and capacity restoration capability than graphite because of stable structure with no formation of lithium dentrite and lower activation energy for charge transfer, and high capacity contribution was more advangeous in transferring Li+ at low temperatures.

Figure 16C:
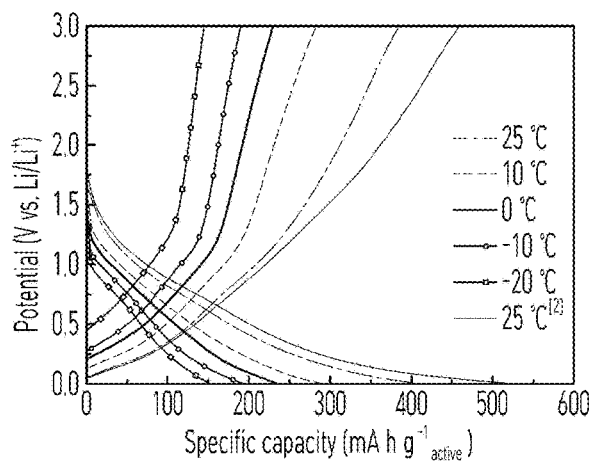

A fifth constant current discharge-charge curve of the ID MOF electrode is shown in FIG. 16C. When a temperature was raised again to 25° C., 25° C.[*] curve (wherein [*] represented a tested curve when a temperature was restored from −40° C. to 25°) almost corresponded to the first temperature of 25° C., without loss of capacity.

Figure 16D:
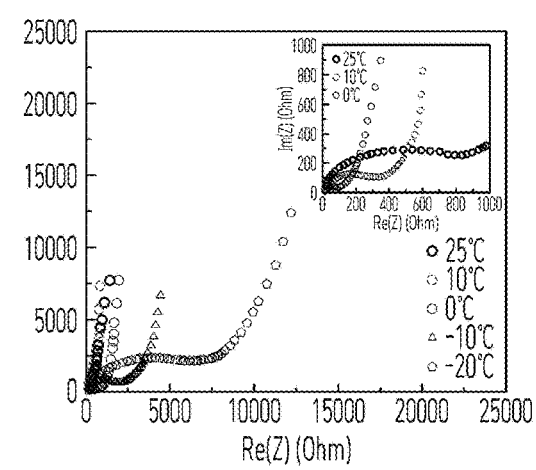

Further, it was checked that even after 50 cycles on 0.2 C, the 1D MOF retained high specific capacity, without any loss of capacity (See FIG. 16D).

It could be appreciated that the above-mentioned results corresponded well to the CV results (See FIG. 16A) and thus had excellent low temperature adaptation.

As described above, the metal-organic framework and the energy storage system having the same according to the present invention can provide excellent electrical conductivity and electrochemical capacity properties. In specific, the metal-organic framework and the energy storage system having the same according to the present invention can provide excellent electrochemical performance at low temperatures.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A metal-organic framework comprising the coordination bond between metals and organic ligands, the organic ligands having one or more species selected from the following group consisting of a first expression, a second expression, and a third expression:

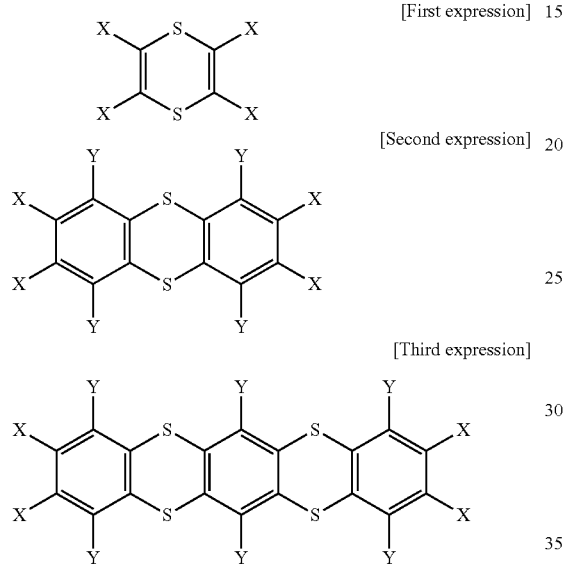

wherein in the first expression, the second expression, or the third expression, is selected independently from the group consisting of OH, NH$_2$, SH, SeH, and COOH, and Y is selectee independently from the group consisting of H, CN, F, Br, OH and OCH$_3$, and wherein the metal-organic framework has a length in the range of 50 nm to 300 μm and a width in the range of 10 nm to 200 μm.

2. The metal-organic framework according to claim 1, wherein the metals are one or more kinds of metal elements or ions selected from the group consisting of Ni, Sc, Ti, V, Cr, Mn, Fe, Co, Cu, Zn, Y, Zr, Nb, Mo, Tc, Ru, Pd, Cd, La, W, Os, Ir, Pt, Au, Hg, Sm, Eu, Gd, Tb, Dy, Ho, Al, Ga, In, Ge, Sn, Pb, Li, Na, K, Rb, Cs, Mg, Ca, Sr, and Ba.

3. The metal-organic framework according to claim 2, wherein the metal is one or more selected from the group consisting of Ni, Cu, Mn, Co, Ti and V.

4. The metal-organic framework according to claim 1, having a shape of a rectangular parallelepiped.

5. The metal-organic framework according to claim 1, wherein X is NH$_2$.

6. The metal-organic framework according to claim 1, wherein Y is H or F.

7. The metal-organic framework according to claim 1, having an electrical conductivity of 1 to 500 μS/m.

8. The metal-organic framework according to claim 1, having a BET specific surface area of 5 to 500 m$^2$/g.

9. An energy storage system comprising a slurry layer containing an electrode active material, the electrode active material comprising a metal-organic framework:

wherein said metal-organic framework comprises the coordination bond between metals and organic ligands, the organic ligands having one or more species selected from the following group consisting of a first expression, a second expression, and a third expression;

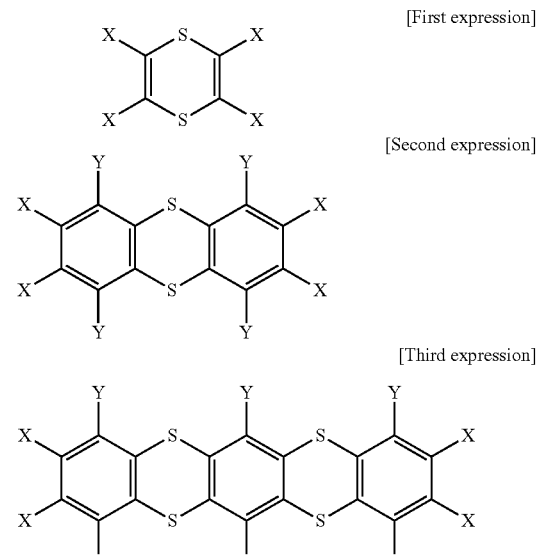

wherein in the first expression, the second expression, or the third expression, X is selected independently from the group consisting of OH, NH$_2$, SH, SeH, and COOH, and Y is selected independently from the group consisting of H, CN, F, Br, OH, and OCH$_3$.

10. The energy storage system according to claim 9, wherein the slurry layer further comprises a conductive additive.

11. The energy storage system according to claim 10, wherein 10 to 200 parts by weight of the conductive additive are present with respect to 100 parts by weight of the metal-organic framework.

12. The energy storage system according to claim 10, having an initial discharge capacity at 0.2 C of 300 to 1000 mAhg$^{-1}$.

13. The energy storage system according to claim 10, having a reversible specific capacity at 0.2 C of 300 to 800 mAhg$^{-1}$.

14. The energy storage system according to claim 10, having a Coulombic efficiency of 70 to 98.5%.

15. The energy storage system according to claim 10, further comprising a separator film.

16. The energy storage system according to claim 9, increasing a specific capacity as the cycle number increases.

17. The energy storage system according to claim 9, which is a secondary battery.

18. The energy storage system according to claim 9, wherein X is NH$_2$.

19. The energy storage system according to claim 9, wherein Y is H or F.

20. The energy storage system according to claim 9, wherein the metal-organic framework has a length in the range of 50 nm to 300 μm and a width in the range of 10 nm to 200 μm.

* * * * *